UNITED STATES PATENT OFFICE.

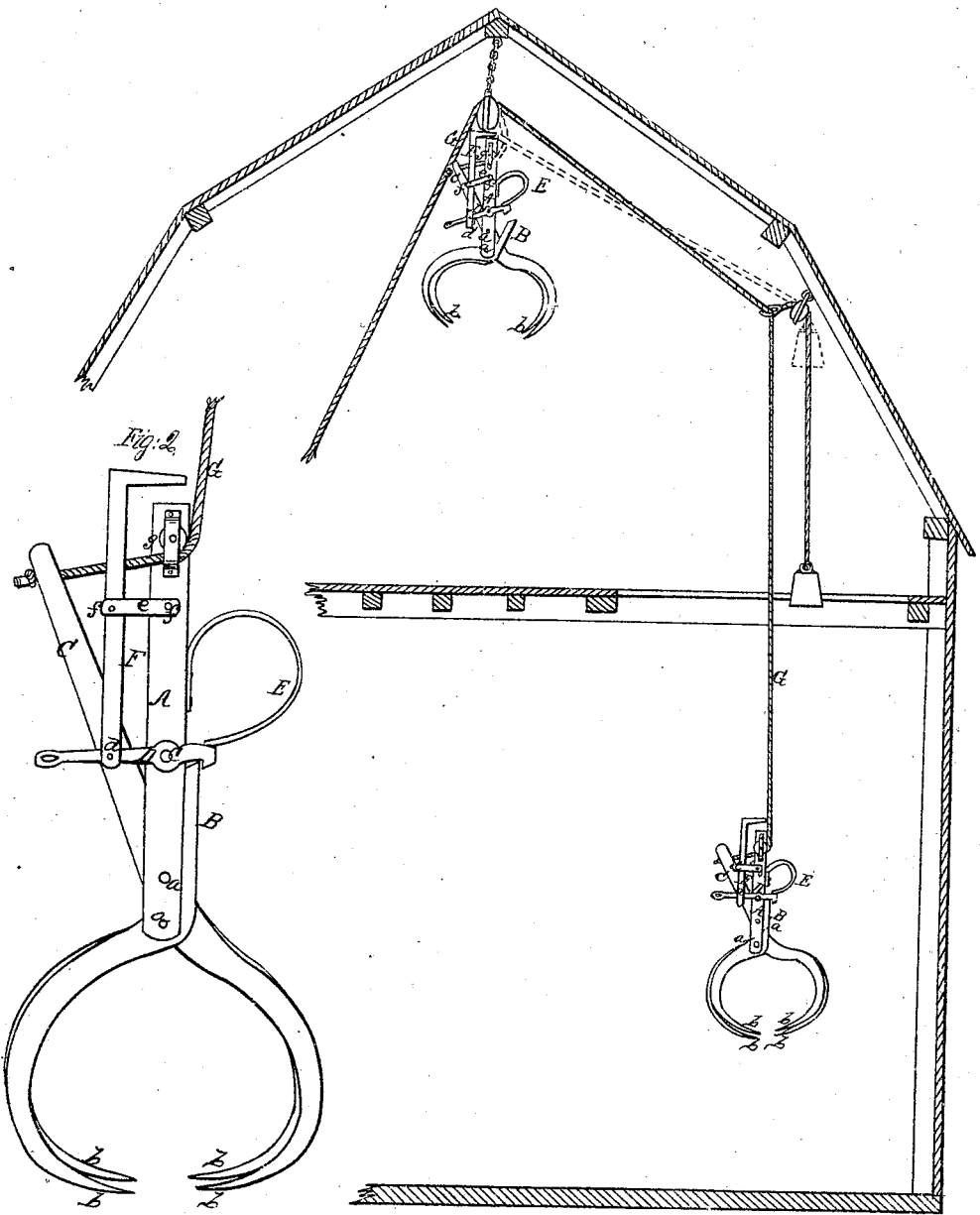

DAVID LIPPY AND JOHN H. PALM, OF MANSFIELD, OHIO.

IMPROVEMENT IN HORSE HAY-FORKS.

Specification forming part of Letters Patent No. 44,102, dated September 6, 1864.

*To all whom it may concern:*

Be it known that we, DAVID LIPPY and JOHN H. PALM, of Mansfield, in the county of Richland and State of Ohio, have invented a new and Improved Horse Hay-Fork; and we do hereby declare that the following is a full, clear, and exact description thereof, which will enable others skilled in the art to make and use the same, reference being had to the accompanying drawings, making a part of this specification, in which—

Figure 1 is a view of our invention shown in use; Fig. 2, an enlarged side view of the same.

Similar letters of reference indicate like parts.

This invention relates to a new and improved hay-fork for elevating hay and discharging it in mows by means of a horse.

The invention consists in the employment or use of a fork constructed with two bars having two or more tines attached to each, the bars being pivoted to a standard provided with a spring-catch, and all arranged in such a manner that the hay will be grasped firmly and elevated to the desired spot, and then discharged by an automatic tripping arrangement, as hereinafter set forth.

A represents a standard, to the lower part of which two bars, B C, are attached by pivots *a a*. These bars have each two or more curved tines, *b*, attached to or formed on them, and the bars B C cross each other, as shown in both figures. The bar B is considerably shorter than the bar C, and it is retained in contact with the standard A by means of a lever-catch, D, the fulcrum-pin *c* of which passes into the standard A, the catch being retained over the upper end of the bar B by means of a spring, E.

F is a bar, the lower end of which is connected by a pin, *d*, to the lever-catch D, said bar being connected by an arm, *e*, to the standard A, which is pivoted to the bar and standard, as shown at *f f*.

The upper end of the bar C has the draft-rope G attached to it, said rope passing under a pulley, *g*, at the upper end of the standard A, and passing through a pulley-block in the upper part of the barn over where the hay is to be discharged, said rope then passing down under a pulley on the flooring of the barn, and having the draft-animal attached to it.

From the above description it will be seen that when the fork is loaded and drawn upward the tines of the bar C will be kept in contact with and made to grasp the hay under the pull of the hoisting-rope, the tines of the bar B being held in position by the lever-catch D. As the fork reaches the desired height the upper end of the bar F comes in contact with the pulley-block at the upper part of the barn, as shown in Fig. 1, and said bar will consequently be depressed and the lever-catch D actuated so as to release the bar B, and the tines of the two bars B C spread apart, and the load is discharged.

In practice we design to have the draft-rope G pass through an eye in a rope which works over a fixed block at the other side of the mow, and has a weight at its lower end sufficiently heavy to admit of the loaded fork ascending vertically until it reaches the eye of said rope, when the weight will be drawn upward and the fork inward over the mow to the pulley-block, where the tripping device is operated to discharge the load. The empty fork, when the horse is backed, is drawn outward from over the mow by the weight.

Having thus described our invention, what we claim as new, and desire to secure by Letters Patent, is—

The two bars B C, provided with tines *b* and connected by pivots *a* to the standard A, in connection with the tripping device composed of a lever-catch, D, spring E, and bar F, or their equivalents, all arranged to operate as and for the purpose specified.

DAVID LIPPY.
JOHN H. PALM.

Witnesses:
A. J. ENDLY,
J. B. DAILY.